Figure 1:
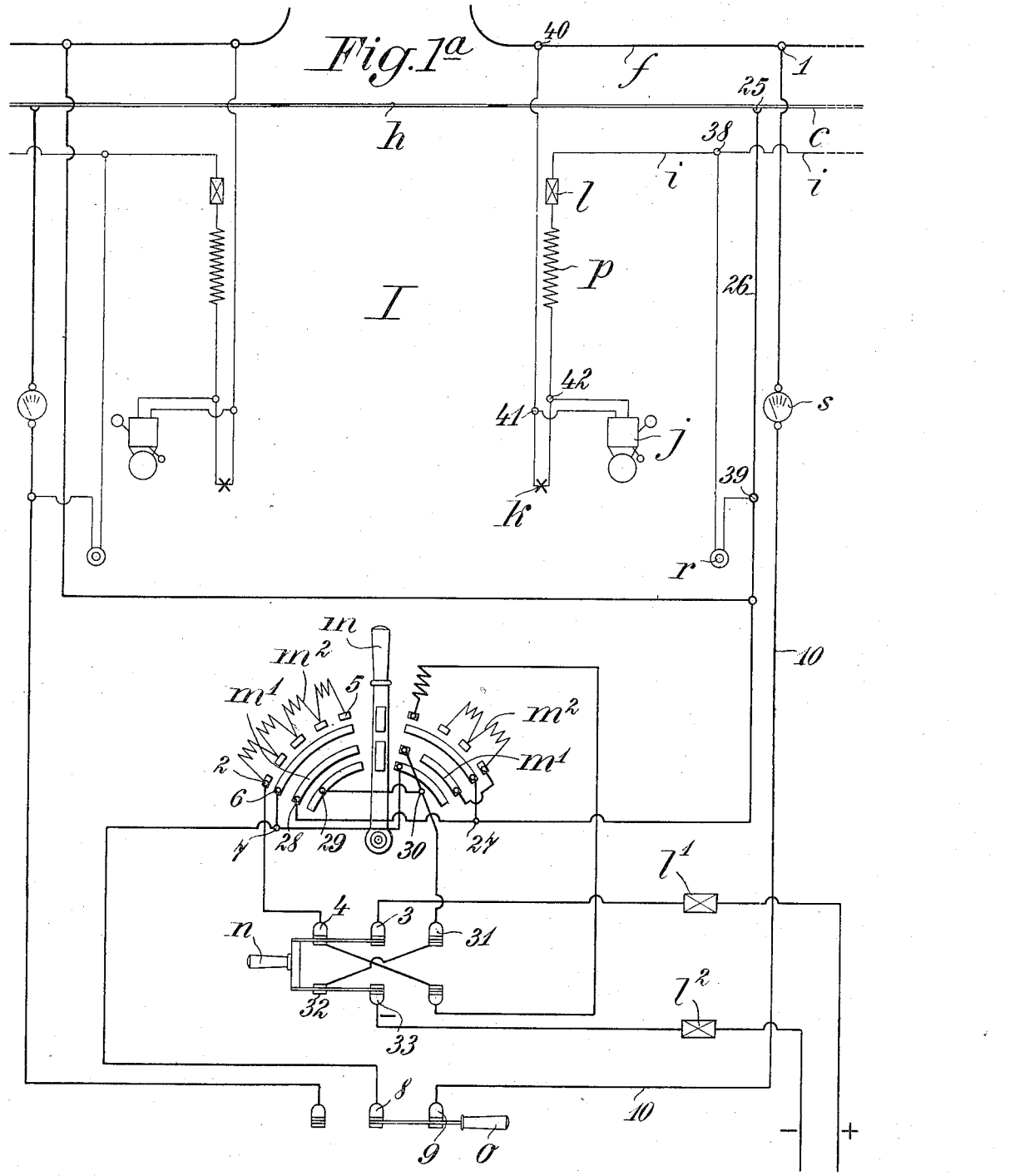

K. HANSEL.
ELECTRIC DESPATCH SYSTEM.
APPLICATION FILED FEB. 2, 1907.
1,046,782.
Patented Dec. 10, 1912.
5 SHEETS—SHEET 2.
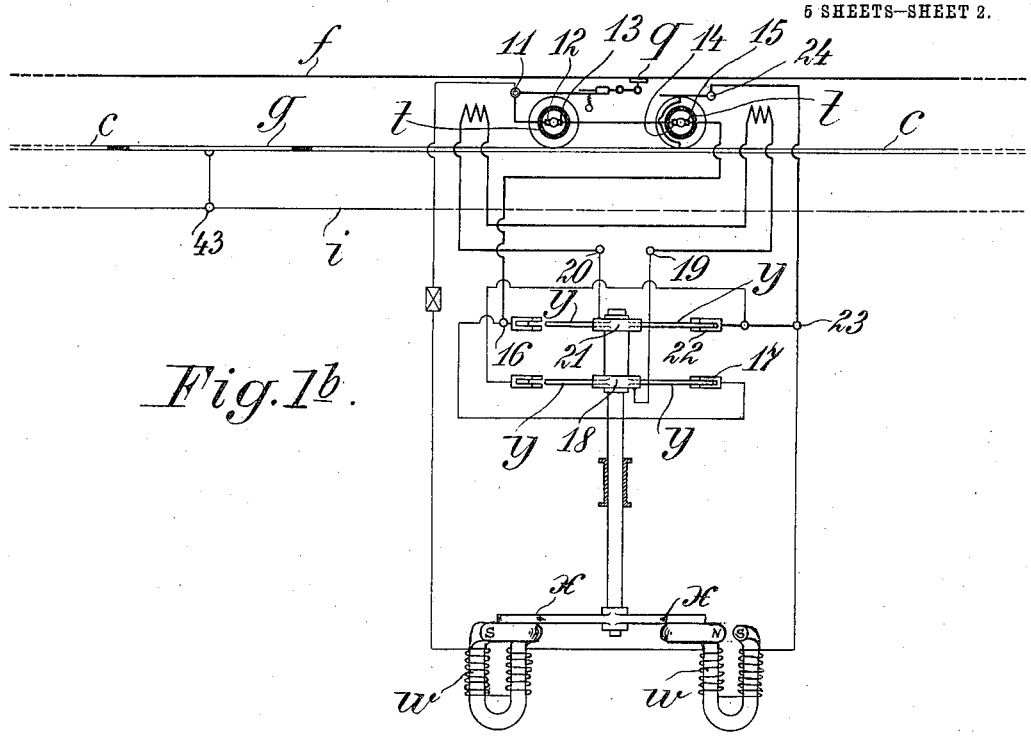
Fig. 1<sup>b</sup>.
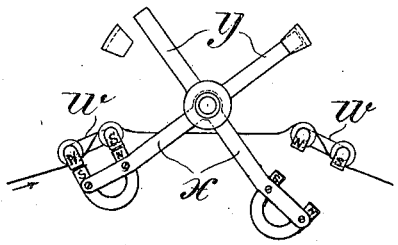
Fig. 2.
Witnesses.
Jesse N. Lutton
B. Dommers
Inventor.
Karl Hansel
by Henry Orth
atty.

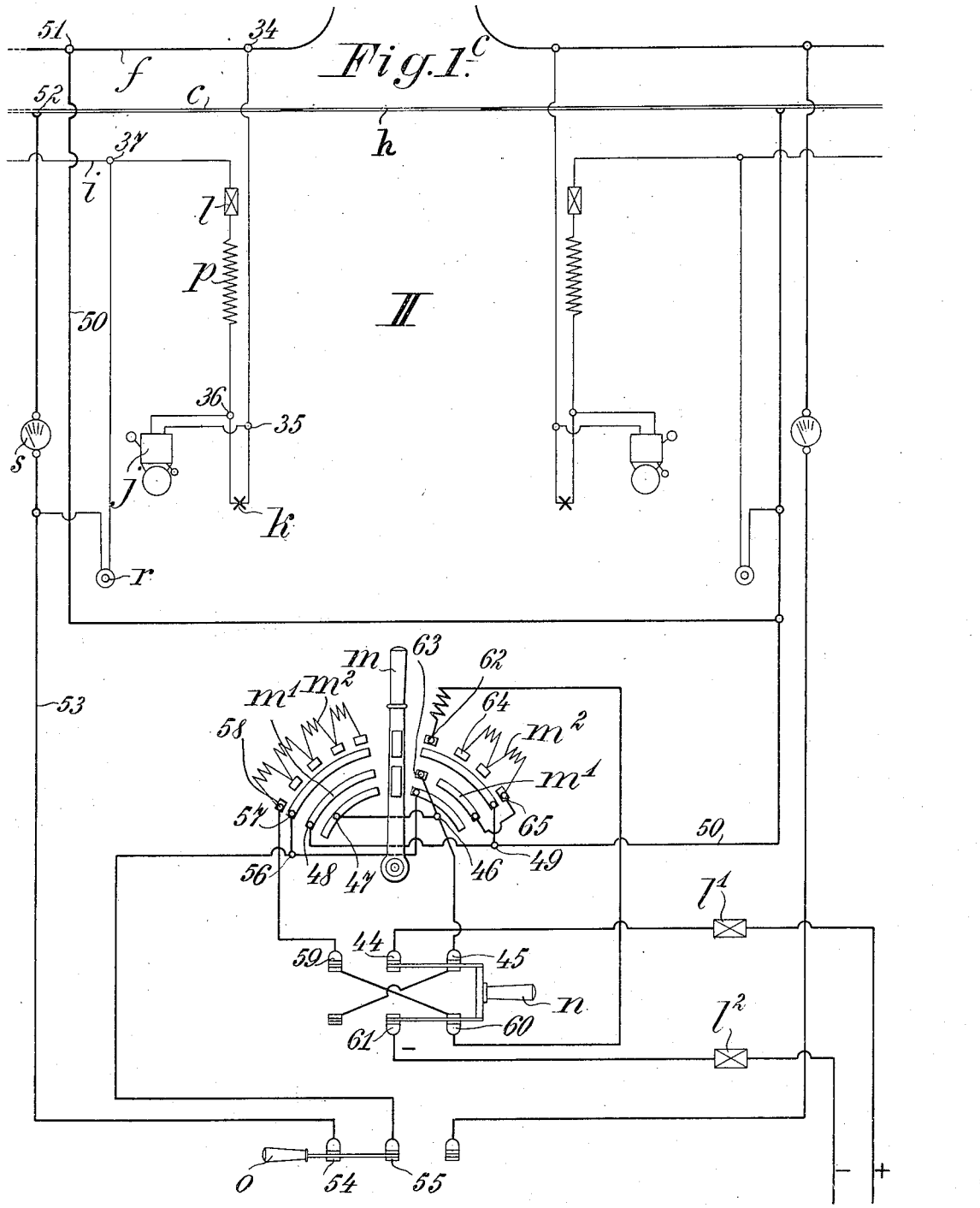

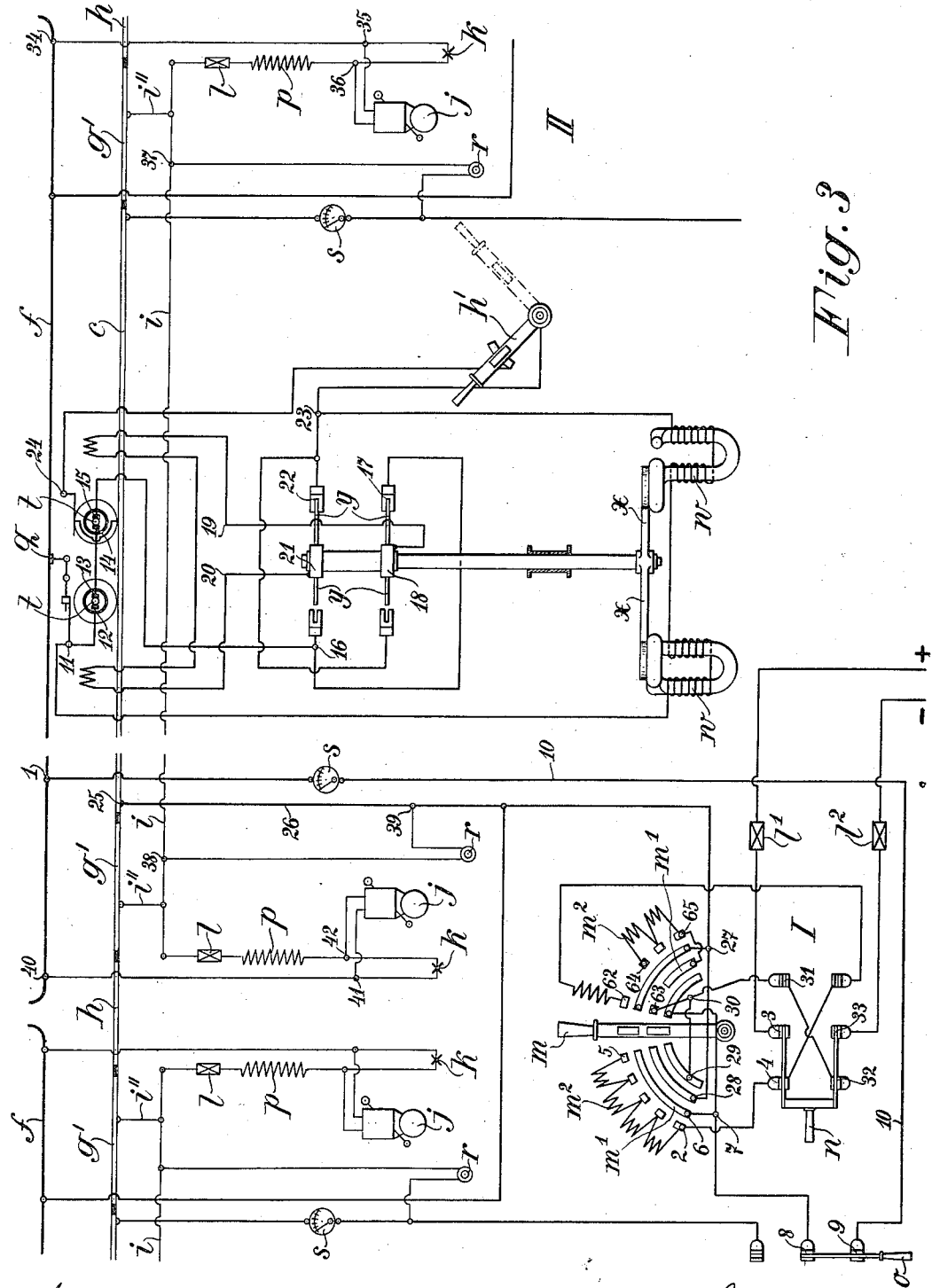

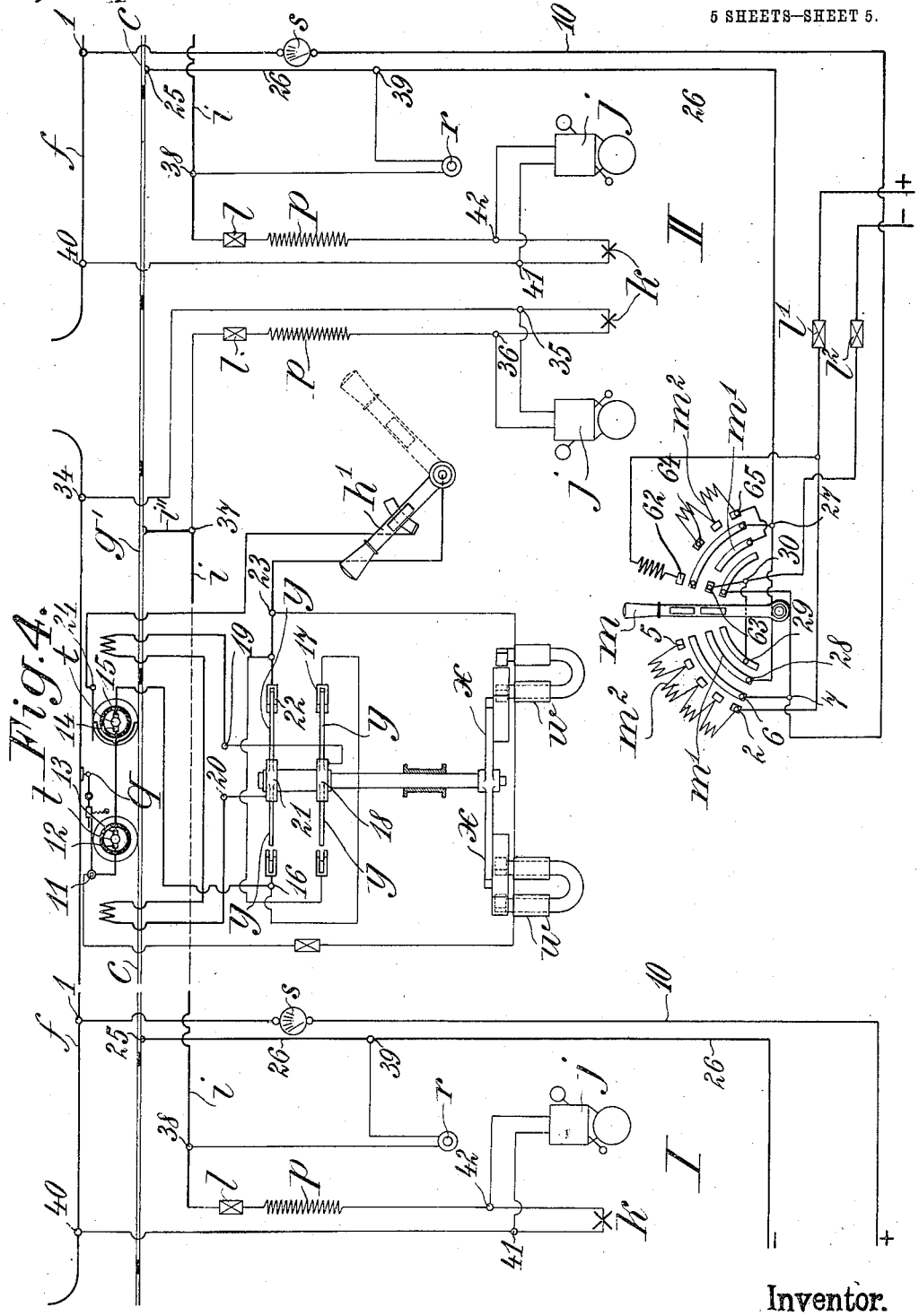

UNITED STATES PATENT OFFICE.

KARL HANSEL, OF VIENNA, AUSTRIA-HUNGARY.

ELECTRIC-DESPATCH SYSTEM.

1,046,782.  Specification of Letters Patent.  Patented Dec. 10, 1912.

Application filed February 2, 1907. Serial No. 355,452.

*To all whom it may concern:*

Be it known that I, KARL HANSEL, subject of the Emperor of Austria-Hungary, residing at Vienna, Austria-Hungary, have invented certain new and useful Improvements in Electric-Despatch Systems, of which the following is a specification.

This invention relates to an underground installation for forwarding postal packages, contained in an electrically driven letter or like carrier.

The installation consists of running rails, electric leads and signaling devices; all of which are arranged in tubes, in which the electrically driven carrier can be forwarded from one station to another at the desired speed and brought to rest at the desired position by manual operation of switching devices.

Referring to the drawings, in which like parts are similarly designated, Figures 1$^a$, 1$^b$ and 1$^c$ taken together show the electric circuits between two stations for one mode of operation; Fig. 2 is a plan view showing the switch $y$ of Fig. 1$^b$. Figs. 3 and 4 show the electric circuits between two stations for cars of another mode of operation.

The requisite equipment of the tube and of the stations differs according to whether the forwarding of a carrier from one station to the next is to be performed from only one of these two stations or from both of them.

There are essentially two modes of operation to be distinguished, namely (I) the forwarding of a carrier from one station to the next depends upon the joint working of both stations; (II) the forwarding of a carrier from one station to another depends only upon the transmitting station, or only on the receiving station.

In the first mode of working the transmitting station forwards the carrier to a certain point on the track in the direction of the receiving station and from this point the receiving station determines the travel of the carrier for the rest of the journey.

In the second mode of working either the transmitting station or the receiving station determines the travel of the carrier from the first named station toward the second, upon a signal exchanged between the two stations and the carrier is then brought to rest at a predetermined point at the receiving station.

The first mode of operation is illustrated by the arrangement shown in Figs. 1$^a$, 1$^b$ and 1$^c$. In a concrete or other suitable tube (not illustrated) are arranged running rails $c$ and electric supply rails $f$.

The rails $c$ which serve as the return lead for the driving current are interrupted electrically in the middle of the track between the stations where there is an insulated signal rail $g$ (Fig. 1$^b$) and also in each station, where there is another insulated rail $h$ (Fig. 1$^a$, 1$^c$) somewhat longer than the carrier or than the train constituted by one or more carriers. The current is conducted from the source situated at each station to the carrier by means of the rail or lead $f$.

The function of the insulated rail $g$ is to cut off the carrier when it arrives at this place from the circuit of the transmitting station and to switch it on to the circuit of the receiving station. The object of limiting the power of each station to one-half the track between the two stations is to insure that the carrier shall not arrive at the receiving station unexpectedly, or before it has been announced, whereby safety in working is achieved. The object of the insulated rail in each station by which the electrical conductor is interrupted at each side of the place where the carrier is to be handled, is to make both sides of the track from the insulated rail $h$ onward, independent of each other so that each can be put into circuit in a suitable manner for the forwarding of a carrier in the required direction.

For signaling the departure or the arrival of a carrier in the neighboring station as well as for indicating at both stations that the carrier has arrived at the middle of the track between them, there is led alongside the track a cable $i$ (Figs. 1$^a$, 1$^b$, 1$^c$) which at both ends is connected with the circuit of the respective signaling apparatus, the current for which is derived from the rail $f$, and at the middle of the track is connected with the insulated rail $g$. In this manner circuits are provided suitable for signaling in shunt to the main circuit.

The arrangement of the stations is as follows: In each station there is a starting switch $m$, a reversing switch $n$ and a track switch $o$. The starting switch comprises a lever which can be moved from its middle or normal position to the left or to the right over the arc-shaped contact strips $m'$ which are connected to the leads through resistance steps $m^2$ in the usual manner. The movement to the left starts the carrier, while the movement to the right brakes it and brings it to rest.

The reversing switch $n$ consists of a contact bow which can be turned to the one side or the other to close the corresponding circuit at suitable contact pieces. In this manner the reversal of the current for the forward and backward running of the motor is effected and with the aid of a polarized distant reversing switch included in shunt to the main current, the motor on the carrier can be reversed. When the reversing switch $n$ is turned over to the left, the direction is for leaving the station at which the switch is situated; while when the switch is turned to the right the direction is for arrival at the station.

The track switch $o$ consists of a contact lever which can be turned in either of two positions in one of which it connects the preceding section of the track with the starting switch and the reversing switch, while in its other position it performs the same connection for the succeeding section of the track. This track switch is used when carriers are not intended to run simultaneously upon the sections of track on each side of the station, in which case, besides the track switch $o$ one switch $m$ and one switch $n$ suffice. When the traffic is heavier, there must be for each section a separate starting switch and reversing switch, in which case the track switch is unnecessary.

Like the running rails $c$ the supply rail $f$ is insulated at the station by means of an insulated portion or an actual interruption for a distance corresponding with the length of the station. Instead of such interruption for the same object, namely to avoid supply of current to the carrier at this place, a hand cut-out $h'$ (Fig. 3) may be arranged on the carrier.

The signaling device for each half of the track consists of a bell $j$, a glow lamp $k$, a safety fuse $l$, a resistance $p$ and a key $r$. In addition there are safety fuses $l'$ and $l^2$ in the current mains between the source of current and the switches; there is also an ampere meter $s$.

At the terminus it is obvious that only one of the apparatus which must be provided in duplicate at the intermediate stations is necessary. The same applies to the other method of control, which will be explained later.

The carriers used comprise motors carried on wheel frames and boxes containing the letters and the like. The boxes may be suspended in such manner that the center of gravity is below the plane passing through the points of support, namely the rails. However, boxes may be used, which rest upon the wheel frame.

Each of the carriers has two continuous current motors $t$ upon or near the wheel axles.

The two motors are in series with each other and with a trolley pole $q$ which bears against the rail $f$ as well as with the aforesaid electrically operated polarized reversing switch $w$ (Figs. 1$^b$ and 2). This reversing switch is of a well-known polarized type and consists of two electromagnets in series in the shunt circuit, one of which attracts a two-armed armature lever when traversed by the current in one direction, the other attracting the armature when the current is in the opposite direction. In this manner the two-armed lever $y$ connected with the armature $x$ by means of a vertical rod and acting as a pole changer, is turned to change the direction of the current in the field windings of the motors and thereby to reverse the direction of rotation of the latter and of the travel of the carrier.

The operation of the installation will now be described for the case in which a carrier is to be forwarded from station I to station II. (Figs. 1$^a$, 1$^b$, 1$^c$.)

The carrier at station I is first pushed by hand from the insulated rail $h$, that is to say from the place at which it stands for being loaded, on to the uninsulated track in the direction of station II sufficiently far for the trolley pole to engage the rail $f$ between the place where the latter is interrupted and the point 1. The track switch $o$ is now turned into the position shown, the reversing switch $n$ is turned into the forward position, that is to say the position shown, and the starting switch $m$ is gradually moved to the point 2 which is the position for supplying the current. At the same time the key $r$ is pressed to give the starting signal for the track laying between the two stations. The following circuits are thus closed from the source of current of station I:

(1.) *The main current circuit.*—From positive pole of the current source (Fig. 1$^a$) over the safety fuse $l'$ to contact 3 of the reversing switch, over the switch lever to contact 4, over contact 2 and resistances $m^2$ to contact 5 of the starting switch, over the lever thereof to point 6 of the outermost contact strip, over point 7 to contact 8 of the track switch, over the lever of this to contact 9 and through lead 10 to point 1 of the rail $f$. From the latter the main current passes through the trolley pole $q$ (Fig. 1$^b$) of the carrier to the left hand motor $t$ and thence over 11, 12, 13, 14, 15, 16, 17, 18, 19, 20, 21, 22, 23 and 24; in its course it flows through the field and armature windings, as well as over the pole changer $y$ which has been turned to the right in consequence of the change of the current direction and then over the wheel frame to the running rail $c$; this it leaves at point 25, passing by the return lead 26 successively over the points 27, 28, 29, 30, 31, 32 and 33 of the reversing switch and finally over the second safety fuse $l^2$ to the negative pole of the source.

(2.) When the signal key $r$ is depressed in station I, a portion of the current that flows to the rail $f$ through the lead 10 passes to station II at the point 34 and passing to point 35 energizes the electric bell $j$ on the one hand and illuminates the glow lamp $k$ on the other hand, in each case passing to point 36, then over the resistance $p$ and the safety fuse $l$ to the terminal 37 of the cable $i$ through the latter back to station I to the terminal 38 and over the depressed key $r$ to the point 39 of the return lead 26 of the main circuit.

(3.) A second shunt circuit to the main circuit is closed by depressing the key $r$ at station I, namely from point 1 of rail $f$ to point 40, thence to point 41, through the bell $j$ on the one hand and the lamp $k$ on the other hand on station I, to point 42, then through the resistance $p$, safety fuse $l$, terminal 38 and over the depressed key $r$ to the point 39 of the return lead 26.

When the starting switch $m$ is moved into the position between points 5 and 2 the armature $x$ of the polarized reversing switch $w$ on the carrier is turned owing to the current flowing through the shunt circuit between the points 11 and 23, which circuit includes the magnets of this reversing switch; the pole changer $y$ is thus brought into the position for changing the current direction to that which determines the running of the carrier from station I to station II, that is to say toward the right in Fig. 1$^b$. The carrier now travels toward station II. At the same time, owing to the depression of the signal key in station I, the signal apparatus in station II indicates that the carrier is traveling on the track between the two stations, so that the operator at station II is advised of the departure of the carrier from station I.

Accordingly as the starting switch $m$ is moved between the points 2 and 5, the carrier travels with less or greater speed toward station II until it runs on to the insulated rail $g$ in the middle of the track. As this happens, this insulated rail becomes electrically connected with the portion of the track rail lying between itself and station I, through the wheel frame, whereby the following circuits in shunt to the main circuit are closed.

A shunt circuit from point 1 through rail $f$ over point 40, the signal apparatus in station I, to terminal 38 of cable $i$, then through the latter to point 43 and the insulated rail $g$ connected therewith. From here the circuit is completed through the wheel frame and running rail $c$. A second shunt circuit starts also from point 1, through point 34 in station II, over the signal apparatus of this station, to terminal 37 of the cable $i$, then through the latter to point 43 and insulated rail $g$, and thence through the wheel frame to the running rail $c$. Owing, therefore to the position of the carrier on the insulated rail, the signal apparatus in both stations is actuated, and both operators are aware that the carrier is now in the middle of the track. As soon as this is the case the track switch $o$ in station II (Fig. 1$^c$) is turned into the position in which it connects the track between the stations with the main leads, the reversing switch $n$ is turned into the position for inward traveling and the starting switch $m$ is moved to the left to the starting position. The carrier now travels on the rest of its journey to station II, since now the motors receive current from the main leads at this station in the proper direction for this direction of travel. The flow of current is now as follows: from the positive pole of the current source in station II over safety fuse $l'$, contact 44 of the reversing switch, over this switch to contact 45, then over point 46, point 47 of the starting switch, over the switch to point 48, then over point 49 and lead 50 to point 51 of rail $f$ through trolley pole $q$ to the motor and after flowing through field windings and armature windings of the latter and through the pole changer $y$ in the manner already described, arrives at rail $c$. The circuit is then through point 52, lead 53, contacts 54, 55, points 56, 57, 58, 59, 60, 61, safety fuse $l^2$, to the negative pole of the current source. As soon as the carrier draws near to station II the starting switch $m$ of this station is turned to the right into the braking position. The switch lever first comes upon contacts 62, 63, whereby so long as this contact is maintained, the direction of the current in the main circuit so far as the track and the carrier are concerned, is changed and therefore the armature $x$ of the reversing switch $w$ is operated and the pole changer $y$ is turned into the other position.

The course of the current will be as follows: from the positive pole of the source of current, (Fig. 1$^c$,) through fuse $l'$, point 44, blade of reversing switch $n$, point 45, contact point 63, controller lever $m$, to the inner arc-shaped contact $m'$, points 56 and 55, switch $o$, point 54, lead 53 to point 52 on rail $c$ through the motors on the carriage, trolley $q$ (Fig. 1$^b$) into rail $f$, thence to point 51, at the same station (station II Fig. 1$^c$) wire 50, point 49, to second arc-shaped contact of $m'$, lever $m$, contacts 62, 60, blade of switch $n$, point 61, fuse $l^2$ to the negative pole of the source of current. The direction of the current in the field windings of the motor is therefore reversed apart from the change of direction of the current in the main current circuit, so that the motor is energized for running in the reverse direction. By the further movement of the starting switch to the right into the position in which it is on contact between and including 64 and 65, the current source of station II is cut off from the main circuit of the motor and the carrier, owing to the counteraction of the current flowing through the main circuit and produced by the further movement of the motor is brought more or less quickly to rest. The circuits will then be as follows: from the motor $t$ of the carriage to conductor rail $f$, point 51 lead 50, point 49, second arc of $m'$, lever $m$, 64, resistance $m^2$, 65, third arc of $m'$, lever $m$, inner arc $m'$, 56, 55, lever $o$, 54 and wire 53 to point 52 in rail $c$.

When the carrier arrives at station II, all the switches are together brought back to the middle position and the carrier is brought by hand to the position for unloading or is pushed on to the next section of track for delivery further on; in the latter case the switches at station II are set in the manner already explained with reference to station I.

When a carrier is to be forwarded from station II to station I, the operations which have been described with reference to station I are performed in precisely similar manner at station II and the operations which have been described with reference to station II are carried out in station I.

For the second mode of operation the following are the arrangements: Two cases must be distinguished, namely, that in which the carrier is to travel on the track in both directions, and that in which the carrier is to travel on a given track always in one and the same direction.

In the first case the equipment of the tube or conduit only differs from that used in the first mode of operation in that the track rail $c$ is electrically continuous throughout the whole distance between the two stations as far as an insulated rail inserted between the sections on each side of each station. This insulated rail begins at that point of the track in front of each station at which the braking of the arriving carrier is to begin, so that the latter may be brought to rest at the desired place. This insulated rail is electrically connected with the cable $i$ which runs between the two stations for signaling purposes.

For the first case of the second mode of operation, where the control of the carriage is from either station over the entire distance between the stations, and where the travel is over a single track in both directions, the equipment of the stations will be the same as already described with respect to the first mode of operation, and the equipment of the concrete tube will be the same as in Fig. 4, showing the electric circuits between two stations for the second case of the second mode of operation, i. e., in which the carrier is to travel on a given track always in one and the same direction.

The arrangement of the circuits and the equipment of the stations according to Fig. 3 for the first case of the second mode of operation is the same as already described with respect to the first mode of operation, illustrated in Figs. 1$^a$, 1$^b$ and 1$^c$, with the exception, that in this case insulated rail sections $g'$ are placed on each side of each rail section $h$ in the station and adjacent thereto, these sections $g'$ being electrically connected to the cable $i$ by cables $i'''$, and with the further exception, that the insulated section of rail $g$ between the stations is omitted.

Now, when a carrier is to be forwarded in accordance with the first case of the second mode of operation, for example from station I (Fig. 3) to station II, the track switch $o$ in station I is turned into the position for feeding the track between the two stations, the reversing switch $n$ is turned into the outward position and the starting switch $m$ is turned into the starting position. Upon these operations there follow the same results as those described under the first mode of operation for the forwarding of the carrier from station I to the middle of the track. As soon as the carrier arrives at the insulated rail $g'$ of station II, the signaling apparatus in both stations are actuated in precisely the same manner as has been described with reference to the first mode of operation when the carrier ran upon the insulated rail $g$ in the middle of the track. As soon as this happens the operator in station I turns the starting switch $m$ to the braking position. The same electrical conditions are thus induced as those described under the first mode of operation as the result of turning the starting switch in the receiving station to the braking position, only there is this difference that the circuit over the signal apparatus of the two stations also remains closed and therefore both the signal apparatus remain actuated so long as the carrier is still running over the insulated rail $g'$.

The bridging of contacts 62, 63 by the starting lever $m$, similarly to that described with respect to the first mode of operation, and according to the duration of contact, effects the alteration of the current in the main line and also in the auxiliary circuit controlled by the switch $w$ on the carriage, whereby the armature $x$ of the reversing switch on the carriage causes the movement of the switch arms $y$ to the other side. The circuit thus established is from the positive pole of the source of current, fuse $l'$, 62, lever m, second arc of m', point 27, lead 26 to point 25 on rails c through the wheel frame to g', through motors t, current collector q, line f, point 1, lead 10, point 7, to fourth arc of m', lever m, 63, 30, fuse l² to negative pole of the source of current, whereby the direction of current is such as to reverse the direction of running of the motors. By the further movement of the starting lever m to the right to points 64, 65, the current source is cut off from the main circuit of the motor and the carrier, owing to the counter action of the current flowing through the main circuit and produced by the further movement of the motor, is brought more or less quickly to rest. When the carriage has moved completely on the insulated rail g' the current passes from the armatures of the motors, current collector q, line f, over point 40, the signal apparatus in station I to terminal 38 of cable i, then through the latter to wire i'' and insulated rail g' and back to the armatures through the carriage frame. The cessation of the indications given by the signaling apparatus shows the operator at station I that the carrier has come to rest at station II, whereupon the said operator brings back the levers of his starting switch, reversing switch and track switch, into the middle position.

The operations are quite similar when the forwarding of the carrier from station I to station II is controlled entirely from station II with the aid of the source of current at the operator's disposal, when he has received a predetermined signal from station I. When the carrier travels in accordance with the second case of the second mode of operation upon a track always in one and the same direction, it may be arranged that the forwarding of the carrier from one station to the next can be controlled either always from the transmitting station alone or always from the receiving station alone. In this case the track switch o and reversing switch n, arranged in the hereinbefore described first case of the second mode of operation, are unnecessary in the equipment of the stations.

The simplified station which may be used when the track switch and the reversing switch are eliminated, is shown in Fig. 4.

The electrical conditions, induced in working with the arrangement according to Fig. 4, are the same as those described with respect to the first case of the second mode of operation.

I claim:

1. In a carrier system, the combination with a current conductor line, a track having one or more insulated sections therein, a motor carriage and means thereon to close circuit between the line and rails; of means at each end of the line to control the current to the motor carriage between the end of the line and the track and a signal circuit in shunt with the main circuit and connected to the insulated rail section whereby said circuit will be closed through the carriage when on said section and means at each end of the line to independently close the signal circuit.

2. In a carrier system, the combination with a current conductor line, current return rails, a carriage having electric motors thereon and a current collector to engage the line and close circuit through the motors to the rails; of means at the station to control the speed of the motors and their reversal, a shunt electric signal circuit, means to signal a distant station, and means at a predetermined point of the track connected to the signal circuit to close circuit through the carriage and said circuit.

3. In a carrier system between two stations, the combination with a current line conductor, current return rail track sections, an insulated track section separating the current return rail sections between stations, a motor car closing circuit between the line and rails through the motors thereof; of a shunt signal circuit between the line conductor and insulated rail to send a signal to each end of the line, controller mechanism at each station to control the current to each track section separated by the insulated rail, and a pole changing switch on the carrier, whereby the direction of travel of the carrier may be controlled from the distant stations.

4. In a carrier system between two stations, the combination with a current line conductor, current return rail track sections, an insulated rail section between stations to electrically separate the track sections, a motor car, mechanism to close circuit between the line and track sections through the motors thereof, and a pole changing switch carried by the car; of a starting switch at each station operating to control switch at each station operating to control the current to line or to reverse the current then being sent to line, and a reversing switch to reverse the current through the starting switch.

5. In a carrier system between stations, the combination with a return current line conductor, return rail track sections, an insulated rail section to electrically separate the track sections between stations, a motor car, mechanism to close circuit between the track and line through the motors thereof, and a pole changing switch carried by the car; of a starting switch at each station operating to control or reverse the current then being sent to line, a reversing switch to reverse the current through the starting switch, and a track switch to direct current to the particular track section starting from the station.

6. In a carrier system between stations, the combination with a return current line conductor, return rail track sections, insulated rail sections to electrically separate the track sections between stations and at the stations, and motor car mechanism to close circuit between the track and line through the motor thereof; of a pole changing switch in parallel with the motor mechanism, a signal at each end of the line included between the line conductor and insulated rail between the stations, and means at each station to control the operation of the carriage on the track section adjacent each station, means to control the current through said pole changing switch and means to send current through the last named means and switch to the desired track section at each station.

7. In a carrier system, the combination with separate sources of electricity, a current conductor line, a track, a motor carriage and means thereon to close circuit between the line and rails; of means at each end of the line to control and reverse current to line from the separate sources of electricity, and a signal circuit to receive current from either source and automatically closed by the carriage.

8. In a carrier system, the combination with a current conductor line, a track having one or more insulated sections therein, a motor carriage and means thereon to close circuit between the line and rails; of means at each end of the line to control and reverse current to line, and a shunt signal circuit between the insulated section and line closed by the motor carriage and extending to the end of the line.

In testimony whereof I have hereunto set my hand in presence of two subscribing witnesses.

KARL HANSEL.

Witnesses:
 JOSEF RUBASCH,
 ALVESTO S. HOGUE.